United States Patent
Åhlander et al.

(10) Patent No.: US 11,012,173 B2
(45) Date of Patent: May 18, 2021

(54) METHOD AND NETWORK NODE FOR ENABLING REDUCED INTERFERENCE IN A WIRELESS NETWORK

(71) Applicant: Telefonaktiebolaget LM Ericsson (publ), Stockholm (SE)

(72) Inventors: Mats Åhlander, Täby (SE); Patrik Rask, Sollentuna (SE); David Sandberg, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/333,473

(22) PCT Filed: Jun. 22, 2017

(86) PCT No.: PCT/SE2017/050695
§ 371 (c)(1),
(2) Date: Mar. 14, 2019

(87) PCT Pub. No.: WO2018/052355
PCT Pub. Date: Mar. 22, 2018

(65) Prior Publication Data
US 2019/0268925 A1  Aug. 29, 2019

(30) Foreign Application Priority Data
Sep. 15, 2016 (WO) .................. PCT/SE2016/050862

(51) Int. Cl.
*H04W 4/00* (2018.01)
*H04J 11/00* (2006.01)
(Continued)

(52) U.S. Cl.
CPC .......... *H04J 11/0056* (2013.01); *H04L 5/005* (2013.01); *H04L 5/0007* (2013.01);
(Continued)

(58) Field of Classification Search
CPC .. H04J 11/0056; H04L 5/0007; H04L 5/0048; H04L 5/005; H04L 5/0053;
(Continued)

(56) References Cited

U.S. PATENT DOCUMENTS

2009/0252075 A1* 10/2009 Ji .......................... H04W 56/00
370/312
2011/0080896 A1* 4/2011 Krishnamurthy ..........................
H04W 72/0406
370/336
(Continued)

FOREIGN PATENT DOCUMENTS

EP  2 557 867 A1  2/2013
EP  2557867 A1 *  2/2013 ............ H04W 56/00
(Continued)

OTHER PUBLICATIONS

International Search Report and Written Opinion dated Sep. 1, 2017 issued in International Application No. PCT/SE2017/050695. (12 pages).
(Continued)

*Primary Examiner* — Thai D Hoang
(74) *Attorney, Agent, or Firm* — Rothwell, Figg, Ernst & Manbeck, P.C.

(57) ABSTRACT

A method and a first network node (800) serving a first cell (800A) in a wireless network, for enabling reduction of interference in a second cell (800B) caused by transmission of reference signals in the first cell (800A). The first network node (800) transmits (8:1) scheduling blocks with said reference signals, using a time offset relative transmission of scheduling blocks in the second cell. A timing advance value is determined (8:3) for a wireless device (802) and the wireless device (802) instructed (8:4) to apply said timing advance value for uplink transmissions. The timing advance value was determined such that uplink symbols transmitted
(Continued)

from the wireless device (802) are aligned with uplink symbols received at a second network node (804) of the second cell (804A).

19 Claims, 9 Drawing Sheets

(51) Int. Cl.
| | | |
|---|---|---|
| *H04L 5/00* | (2006.01) | |
| *H04L 27/26* | (2006.01) | |
| *H04W 72/12* | (2009.01) | |
| *H04W 56/00* | (2009.01) | |

(52) U.S. Cl.
CPC .......... *H04L 5/0048* (2013.01); *H04L 5/0053* (2013.01); *H04L 5/0062* (2013.01); *H04L 5/0073* (2013.01); *H04L 27/2613* (2013.01); *H04W 56/0005* (2013.01); *H04W 56/0045* (2013.01); *H04W 72/1268* (2013.01); *H04W 72/1289* (2013.01)

(58) Field of Classification Search
CPC . H04L 5/0062; H04L 5/0073; H04L 27/2613; H04L 72/1289; H04L 72/1268; H04L 56/0005; H04L 56/0045
USPC ................ 370/329–330, 335–345, 347–348, 370/436–439, 441–447, 458–462
See application file for complete search history.

(56) References Cited

U.S. PATENT DOCUMENTS

| | | | | |
|---|---|---|---|---|
| 2011/0194527 | A1* | 8/2011 | Lin ...................... | H04B 7/022 370/330 |
| 2011/0280223 | A1 | 11/2011 | Maeda et al. | |
| 2012/0099520 | A1 | 4/2012 | Kwon et al. | |
| 2012/0178482 | A1* | 7/2012 | Seo ...................... | H04L 1/1854 455/501 |
| 2013/0083780 | A1 | 4/2013 | Luo et al. | |
| 2014/0029508 | A1 | 1/2014 | Kim et al. | |
| 2014/0219237 | A1 | 8/2014 | Charbit et al. | |
| 2014/0314000 | A1* | 10/2014 | Liu ..................... | H04W 52/365 370/329 |
| 2015/0094092 | A1 | 4/2015 | Kangas et al. | |
| 2015/0103782 | A1 | 4/2015 | Xu et al. | |
| 2015/0195841 | A1 | 7/2015 | Lorca Hernando | |
| 2015/0372779 | A1 | 12/2015 | Lim et al. | |
| 2016/0234763 | A1 | 8/2016 | Um et al. | |
| 2016/0294516 | A1 | 10/2016 | Zirwas | |
| 2017/0079028 | A1* | 3/2017 | Dinan ............... | H04W 56/0045 |
| 2017/0086153 | A1* | 3/2017 | Yoon .................. | H04L 27/2675 |
| 2017/0099667 | A1* | 4/2017 | Dinan .................. | H04L 5/0053 |
| 2017/0303220 | A1* | 10/2017 | Sadeghi ............. | H04W 56/001 |
| 2017/0310435 | A1* | 10/2017 | Wei ........................ | H04L 5/0007 |
| 2018/0270007 | A1 | 9/2018 | Sandberg et al. | |
| 2019/0037529 | A1* | 1/2019 | Edge ................... | H04W 64/003 |
| 2019/0268925 | A1* | 8/2019 | Hlander ............... | H04J 11/0056 |
| 2020/0260452 | A1* | 8/2020 | Dinan ............... | H04W 72/0446 |

FOREIGN PATENT DOCUMENTS

| | | |
|---|---|---|
| WO | 2015/074719 A1 | 5/2015 |
| WO | 2017/052448 A1 | 3/2017 |

OTHER PUBLICATIONS

International Search Report and Written Opinion dated Nov. 28, 2016 in related International Application No. PCT/SE2016/050862. (13 pages).
China Unicom, "Time shifting to protect control region from legacy CRS interference", 3GPP TSG-RAN WG1, Meeting #67, R1-114201, San Francisco, USA, Nov. 14-18, 2011. (4 pages).
Non-Final Office Action dated Apr. 22, 2019 issued in related U.S. Appl. No. 15/761,297. (27 pages).
Final Office Action dated Nov. 4, 2019 issued in related U.S. Appl. No. 15/761,297. (12 pages).
Non-Final Office Action dated Mar. 13, 2020 issued in U.S. Appl. No. 15/761,297. (13 pages).

* cited by examiner

200: Serving cell

204

202: Neighbour cell

CRS shift

206 frequency / time

▨ CRS

▒ Interfered data/control

Downlink transmissions

Uplink transmissions received by 1st network node

METHOD AND NETWORK NODE FOR ENABLING REDUCED INTERFERENCE IN A WIRELESS NETWORK

CROSS REFERENCE TO RELATED APPLICATION(S)

This application is a 35 U.S.C. § 371 National Stage of International Patent Application No. PCT/SE2017/050695, filed Jun. 22, 2017, designating the United States and claiming priority to International application no. PCT/SE2016/050862, filed on Sep. 15, 2016. The above identified applications are incorporated by reference.

TECHNICAL Field

The present disclosure relates generally to a method and a network node of a first cell in a wireless network, for enabling reduction of interference in a second cell from reference signals transmitted in the first cell.

BACKGROUND

In a wireless network comprising a plurality of network nodes, it is desirable to utilize available radio resources as efficiently as possible so as to achieve high capacity and adequate performance in communication with wireless devices. The term "wireless network" is used in this description to denote any network comprising network nodes such as base stations, access points, eNodeBs or the like which are capable of radio communication with wireless devices, e.g. by transmitting scheduling blocks carrying reference signals and typically also various data and control information.

The nodes in the network that performs such radio communication with wireless devices are also generally denoted "network nodes" herein. Further, the term "wireless device" denotes any communication equipment that is capable of radio communication with network nodes in a wireless network. Some non-limiting examples of wireless devices that may be involved in the procedures described herein include mobile phones, smartphones, tablets, laptop computers and Machine-to-Machine, M2M, devices. Throughout this description, the term "User Equipment", UE, may be used instead of wireless device.

In order to support coherent downlink reception as well as to evaluate whether a connection to a network node is suitable for communication, and if so to configure various parameters for the communication, the wireless devices are requested to perform measurements on predefined reference signals which are regularly transmitted from the network node. In a wireless network operating according to Long Term Evolution, LTE, signals are transmitted by the network nodes using Orthogonal Frequency-Division Multiplexing, OFDM, which is a method of encoding digital data on multiple carrier frequencies. In this description the reference signals will be referred to as "Cell-specific Reference Signals", CRSs, which term is commonly used in LTE.

In downlink transmission according to LTE, the smallest schedulable resource is commonly referred to as a "scheduling block" which is illustrated in FIG. 1A. For consistency the term scheduling block will be used throughout this description, regardless of whether it carries any data or not. However, any of the terms "resource block" and "resource grid" could also be used herein as a synonym for scheduling block. Another term that is commonly used in this context is Physical Resource Block, PRB. A scheduling block may carry various reference signals as well as data and control signaling, see below. The scheduling block described herein may thus carry one or more of data, control signaling, reference signals, synchronization signals, etc., and the description is not limited in this respect.

A downlink transmission may comprise multiple scheduling blocks which can be "stacked" the frequency domain to fill the available system bandwidth or any part thereof. A scheduling block 100 may typically extend over 180 kHz during 1 millisecond, ms. This resource 100 is further divided into 12 subcarriers in the frequency domain. In the time domain this resource is divided into 14 OFDM symbols as shown in FIG. 1 when a normal cyclic prefix is used, or 12 OFDM symbols when an extended cyclic prefix is used. The cyclic prefix is used in OFDM to maintain orthogonality between subcarriers when the signal is distorted by multipath propagation. The scheduling block 100 in FIG. 1 is shown as a "resource grid" divided into 12 elements in the frequency domain representing the subcarriers and 14 elements in the time domain representing the OFDM symbols.

The smallest resource in LTE is comprised of one Resource Element, RE, 100A which corresponds to one subcarrier 100B during one OFDM symbol 100C. The scheduling block 100 is thus comprised of 12×14 REs. The first 1 to 3 OFDM symbols in this example compose the control region where mainly the Physical Downlink Control Channel, PDCCH, is multiplexed. The rest of the OFDM symbols in the scheduling block 100 compose the data region, where mainly the Physical Downlink Shared Channel, PDSCH, is multiplexed.

Some resource elements in the time/frequency grid are used for transmitting CRSs which are indicated in FIG. 1A as striped resource elements, while the resource elements used for data and control are non-striped. A predetermined sequence of CRSs is transmitted in predefined RE positions known to the wireless devices. The CRSs can be used by wireless devices for synchronization, downlink channel estimation, determination of a Channel Quality Indicator, CQI, a Rank Indicator, RI and a Precoding Matrix Indicator, PMI, as well as for mobility measurements such as the Reference Signal Received Power, RSRP, etc.

Since CRSs are used also for cell measurements by wireless devices in idle mode which are more or less unknown to the network, the CRSs need to be transmitted even if there are no wireless devices attached to the cell. Note that this description has been simplified to involve only one antenna. If more antenna ports are used (e.g. 2 or 4), the resource grid of one antenna will contain unused REs in positions that are used for a CRS on the other antenna.

However, when a scheduling block is transmitted in two cells at the same time using the same CRS positions, the CRSs in the two cells will coincide and may therefore also interfere with each other, which is illustrated in FIG. 1B. In this figure, CRSs are transmitted in the predefined REs by a network node 102 of a first cell 102A and also by a network node 104 of a second cell 104A. When wireless devices 106 present in the first cell 102A try to measure the CRSs from the network node 102, they will also receive interfering CRSs from the network node 104. Similarly when wireless devices 108 present in the second cell 104A try to measure the CRSs from the network node 104, they will also receive interfering CRSs from the network node 102. The interfering CRSs are indicated by dashed arrows.

As a result, the CRS measurements in either cell will be too "pessimistic" due to the interference of CRSs from the other cell, and if the CRS measurements are used for channel estimation or the like, the channel may be under-estimated since the above harmful interference from CRSs, which interference made the CRS measurements pessimistic, will not occur when data is transmitted in other REs. The capacity of the network may therefore not be fully utilized due to such pessimistic and misleading CRS measurements. This under-estimation of the channel can be avoided by not transmitting the CRSs in the same REs in the two cells, but then the CRSs in one cell may instead interfere with data transmissions in the other cell.

SUMMARY

It is an object of embodiments described herein to address at least some of the problems and issues outlined above. It is possible to achieve this object and others by using a method and a network node as defined in the attached independent claims.

According to one aspect, a method is performed by a first network node of a first cell in a wireless network, for enabling reduction of interference in a second cell from reference signals transmitted in the first cell. In this method, the first network node transmits in the first cell scheduling blocks where said reference signals are located in predefined resource element positions, using a time offset relative transmission of scheduling blocks in the second cell. The first network node also determines a timing advance value for a wireless device that is served by the first network node, and then instructs the wireless device to apply said timing advance value for uplink transmissions. The timing advance value is determined such that uplink symbols transmitted from the wireless device are aligned with uplink symbols received at a second network node of the second cell.

According to another aspect, a first network node is arranged to serve a first cell in a wireless network and enable reduction of interference in a second cell from reference signals transmitted in the first cell. The first network node is configured to transmit in the first cell scheduling blocks where said reference signals are located in predefined resource element positions, using a time offset relative transmission of scheduling blocks in the second cell. The first network node is further configured to determine a timing advance value for a wireless device served by the first network node, and to instruct the wireless device to apply said timing advance value for uplink transmissions, the timing advance value being determined such that uplink symbols transmitted from the wireless device are aligned with uplink symbols received at a second network node of the second cell.

The above method and network node may be configured and implemented according to different optional embodiments to accomplish further features and benefits, to be described below.

A computer program is also provided comprising instructions which, when executed on at least one processor in the network node, cause the at least one processor to carry out the method described above. A carrier is also provided which contains the above computer program, wherein the carrier is one of an electronic signal, optical signal, radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to reduce the impact of interference from downlink transmission of reference signals, such as CRSs, in a scheduling block by applying a time offset in one cell relative another neighboring cell so that the scheduling blocks will not be transmitted at the same time in the two cells but with a time difference corresponding to the time offset. Thereby, the interference from a transmitted CRS will not hit a single RE in either cell but it will be distributed, or "spread out", over two or more REs which reduces the impact on each RE in the opposite cell. The time offset may be a fraction of the duration of an OFDM symbol. In this description, the term "neighboring cells" is used to indicate that the cells are located close enough to cause interference across the cells. Hence, the neighboring cells may or may not actually border one another.

Figure 1A:
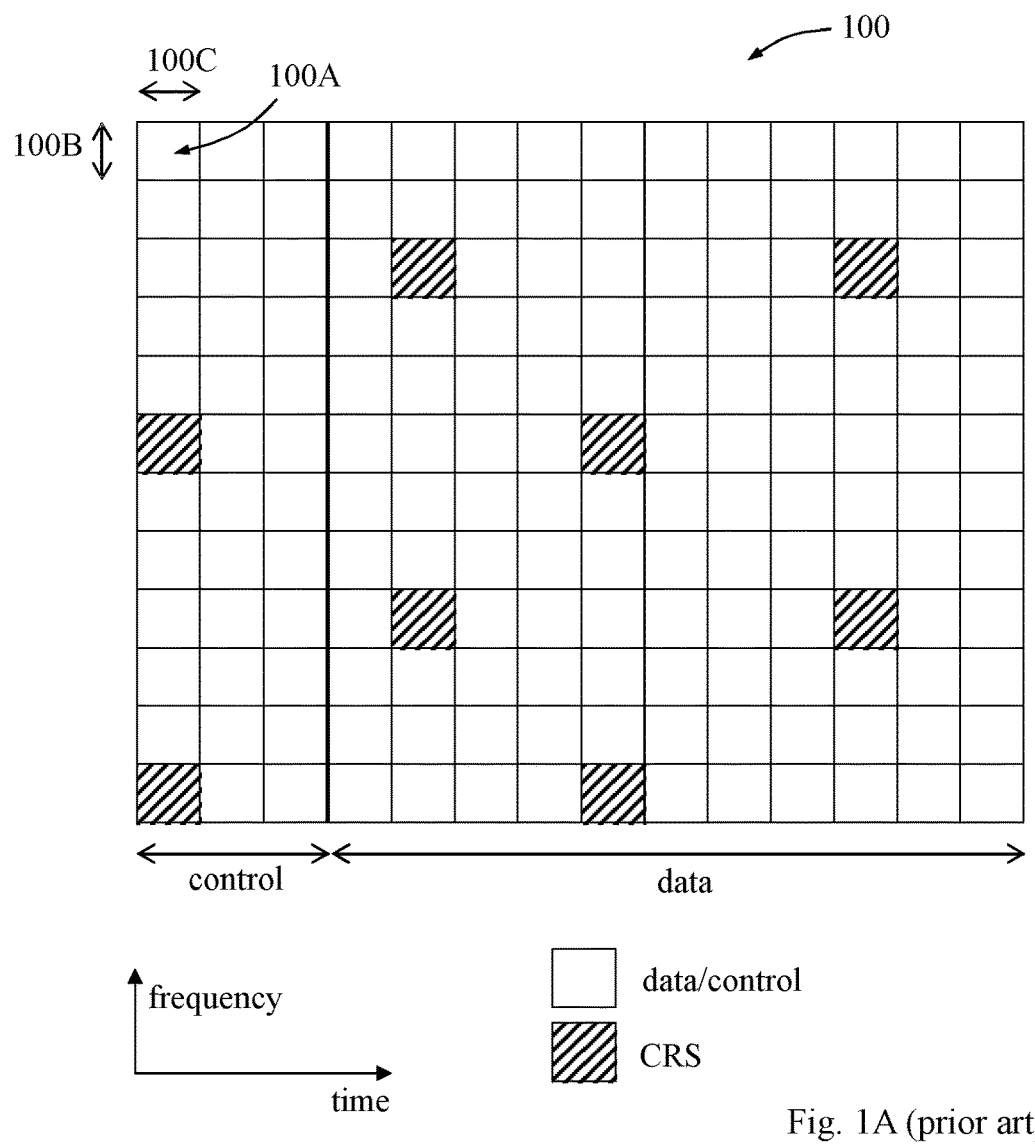
FIG. 1A illustrates schematically a regular downlink scheduling block with resource elements used for reference signals in predefined positions, according to the prior art.
Figure 1B:
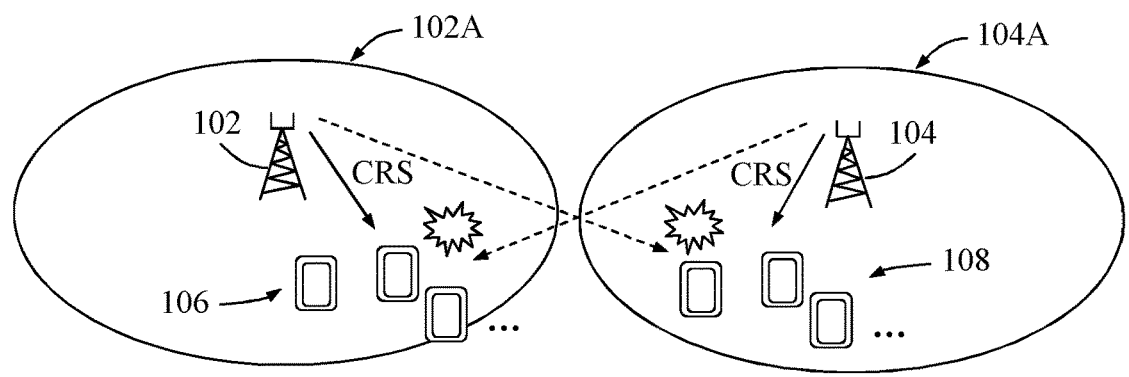
FIG. 1B is a communication scenario illustrating how transmission of CRSs simultaneously in two cells may cause interference, according to the prior art.
Figure 2:
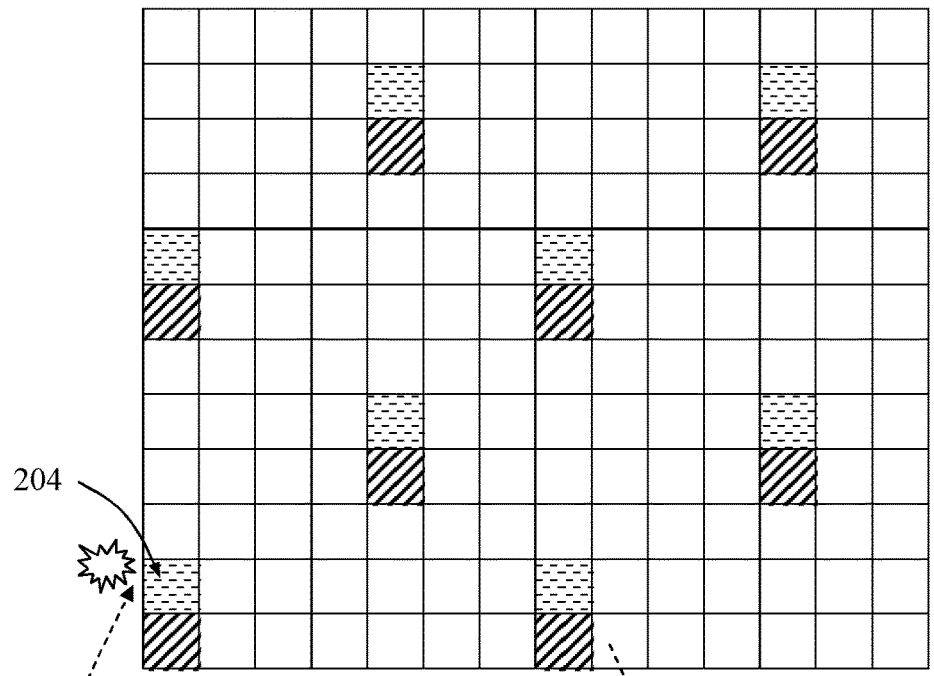
FIG. 2 illustrates how CRSs transmitted in one cell may interfere with data and control signals transmitted in another cell when frequency-shifted CRSs are used.
Figure 2:
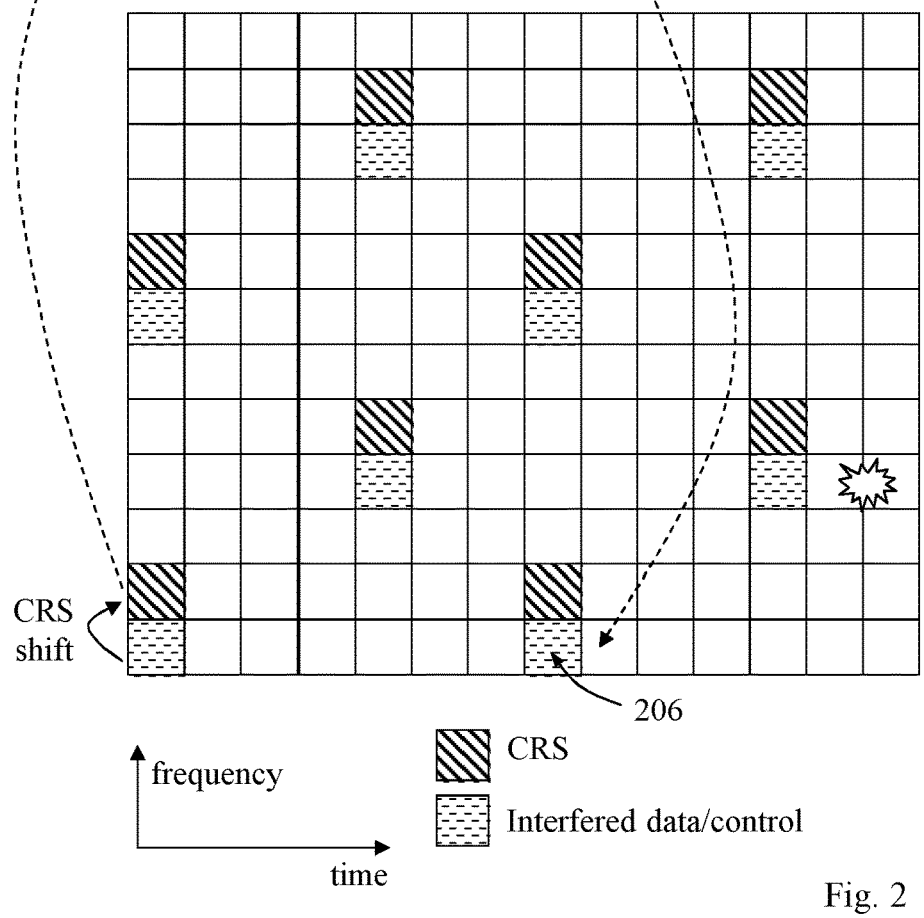

One possible way of avoiding the above-described interference between CRS transmissions on the downlink in two cells is to shift the CRSs one or two REs only in the frequency domain in one of the cells, which is illustrated in FIG. 2 depicting a scheduling block 200 transmitted in a serving cell and a scheduling block 202 transmitted in a neighbor cell. In this example, the scheduling block 200 is transmitted in the serving cell with CRSs positioned as shown in FIG. 1A, and at the same time the scheduling block 202 is transmitted in the neighbor cell with all CRSs shifted one RE in the frequency domain. FIG. 2 thus illustrates what would happen if the above-mentioned time offset is not applied at frequency shifted CRSs.

As indicated above, transmission of such frequency shifted CRSs on the downlink may instead cause interference by hitting REs used in another cell for data or control, e.g. as indicated by dashed arrows. An example RE in scheduling block 200 that is hit by such interference from scheduling block 202 is denoted 204. It should be noted that such interference may also occur in the opposite direction when shifted CRSs are applied in one of the cells, and an example RE in scheduling block 202 that is hit by such interference from scheduling block 200 is denoted 206.

The above-described CRS interference on the downlink from one cell to another cell when frequency shifted CRSs are not applied in any of the cells, may lead to under-utilized radio resources and low throughput due to the pessimistic and misleading CRS measurements. On the other hand, the use of frequency shifted CRSs should provide more accurate channel quality estimation, but the CRS transmissions may instead cause interference on data or control REs in the opposite cell.

In this solution, it has been recognized that interference from downlink symbols on uplink symbols may occur across two or more cells when time division duplex (TDD) is employed in the cells. It has also been recognized that a fast Fourier transform (FFT) operation on symbols received in two or more cells could be affected when a time offset is used in at least one of the cells. These potential drawbacks may be avoided by instructing each wireless device to apply a timing advance value for uplink transmissions so that the uplink transmissions, or uplink carriers, from the wireless devices are aligned with one another so that their transmitted symbols or subframes are received at a network node in a synchronized manner, i.e. substantially at the same time.

In this description, the term "aligned" means that uplink symbols transmitted from a wireless device in one cell that applies a time offset virtually coincide in time with uplink symbols transmitted in another cell that applies a different time offset or no time offset, when said uplink symbols are received at a network node of another cell. This implies that uplink symbols or subframes from wireless devices in different cells can be regarded as being received simultaneously at one or more network nodes not applying the same time offset. However, there may be slightly different propagation delays between the wireless devices and the network nodes although these delay differences are negligible in this context. The alignment of uplink symbols and how it can be achieved will be described in more detail below.

The timing advance values given to the wireless devices can thus be determined in this solution to compensate for the time offset applied to the downlink transmission in the cell so that uplink transmission from the wireless devices will be aligned at the receiving network node as if no time offset had been applied to the downlink transmission. In effect, while downlink transmission is time shifted between adjacent cells, a timing advance value is determined for a wireless device so that its uplink transmission is not time shifted in the same way as the downlink transmission. Hence, the uplink transmission does not follow the time offset applied on the downlink transmission.

It was mentioned above that the impact or harmful effect of interference from transmission of reference signals in a scheduling block can be reduced, according to the embodiments herein, by applying a time offset in one cell relative the other cell so that the reference signals will not completely coincide with single REs in the other cell. Thereby, the interference from a reference signal in a scheduling block transmitted in one cell will be distributed over several resource elements in the scheduling block transmitted in the opposite cell so that the impact of the interference in each resource element is reduced, as compared to when all interference from the reference signal hits one single resource element when no time offset is used. This will now be described in more detail with reference to FIG. 3 which corresponds to FIG. 2 but with the time offset applied.

Figure 3:
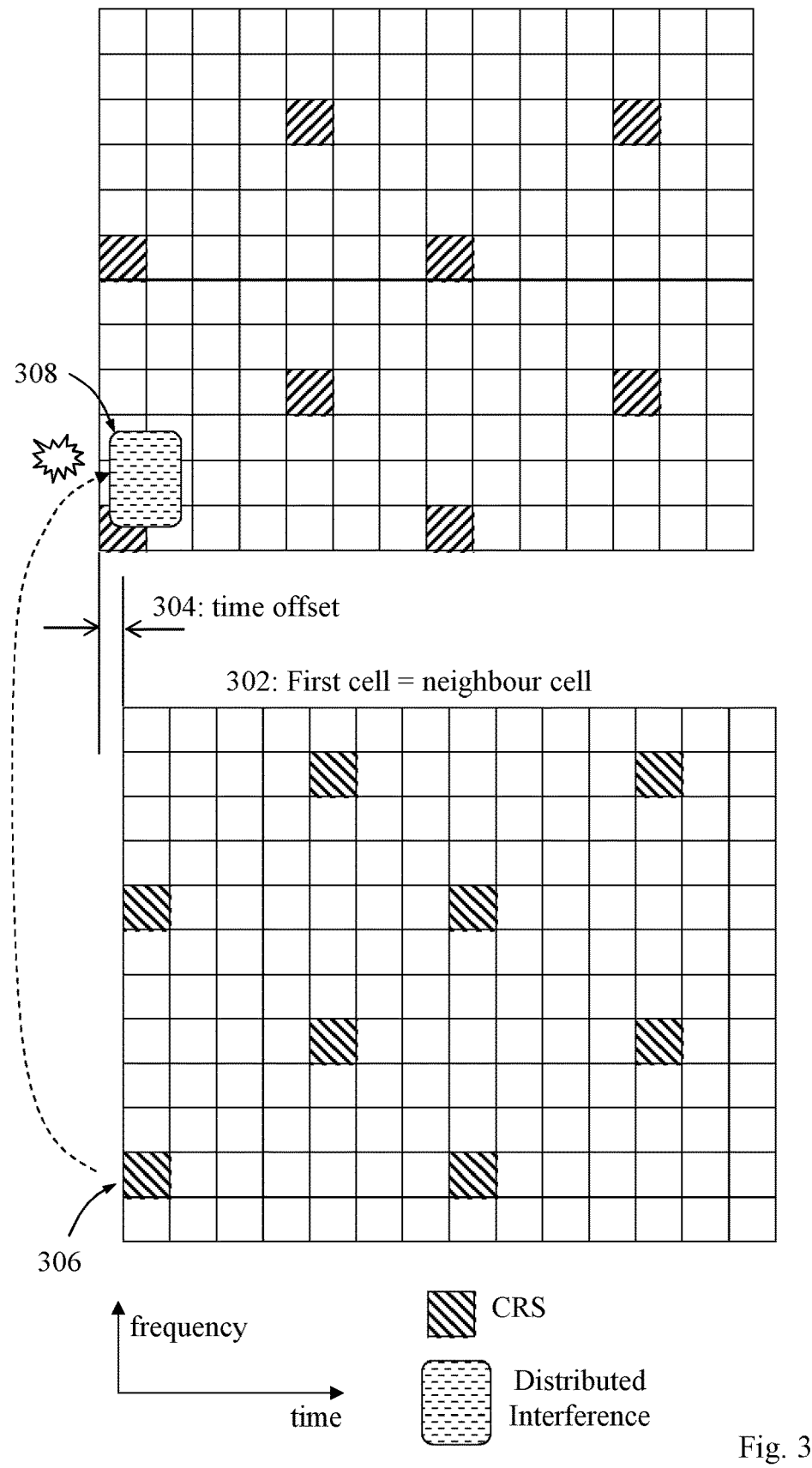
FIG. 3 illustrates how the interference caused by transmission of CRSs in a first cell can be spread out in a second cell by using a time offset in the first cell, according to some example embodiments.

In FIG. 3, scheduling blocks are transmitted in a first cell and in a second cell where the above-described time offset is used in the second cell. In more detail, a scheduling block 300 is transmitted in the second cell, corresponding to the above-mentioned serving cell, and a scheduling block 302 is transmitted in the first cell, corresponding to the above-mentioned neighbor cell, with a time offset 304 relative the scheduling block 300 in the second cell. The reference signals are represented by CRSs in FIG. 3 for simplicity, although it should be understood that other types of reference signals could also be used in the manner described herein and the solution is not limited in this respect. The network node that instructs its served wireless device(s) to apply a timing advance value for uplink transmissions according to embodiments herein corresponds to the network node that transmits the scheduling block 302 in FIG. 3 with the time offset 304 applied, in this case a slight delay relative the scheduling block 300 which delay can be less than one OFDM symbol in time domain.

In the example of FIG. 3, the above-described frequency shift of CRSs is also applied in the first cell by shifting the CRSs in the scheduling block 302 one RE in the frequency domain relative the corresponding CRSs in the scheduling block 300. However, the embodiments herein are also applicable when no such frequency shift of CRSs is applied in the first cell.

FIG. 3 illustrates that an example CRS 306 transmitted in the first cell causes interference 308 in the second cell which is distributed, i.e. spread out, over several REs in the second cell both in the time domain and in the frequency domain, in this case over roughly six REs, as a result of the applied time offset 304. If the time offset 304 is applied but no CRS frequency shift is applied, the CRS interference would still be distributed over roughly four REs, not shown, thus reducing the peak interference that hits a single RE. Even though the interference from a reference signal in the first cell will hit multiple resource elements in the second cell instead of one, the wanted signal in each resource element can be detected and decoded more successfully due to the lower peak interference. This way, the harmful effect of said interference can be reduced.

Conventionally, wireless devices are instructed to apply a timing advance to compensate for propagation delays so that their uplink transmissions are more or less coordinated with downlink transmissions in a certain time relation between uplink and downlink, and the timing advance increases with increased distance from the serving network node. Such conventional timing advance for uplink transmissions will now be described.

Uplink synchronization and time coordination towards downlink (DL) transmissions of a DL cell carrier is in LTE normally performed as follows. When a wireless device attempts to connect to a cell, it first listens to primary and secondary synchronization channels transmitted in DL by the serving network node. The wireless device uses these signals to synchronize its internal timing against the transmission timing of a DL frame structure of the cell.

Initial access and time coordination towards uplink (UL) transmissions of an UL cell carrier is in LTE normally performed as follows. After having completed the synchronization towards the DL frame structure of the cell, the wireless device transmits a Random Access message (PRACH), also referred to as "message 1". The PRACH is sent on a physical resource that is specified in DL broadcast information. At the detection of PRACH, the time of arrival of the PRACH is measured by the serving network node. Since it is known that PRACH must be transmitted at the beginning of an UL subframe, the network node can use this information to calculate the propagation delay between the wireless device and the network node, which is well-known in the art.

The propagation delay corresponds to the initial timing displacement between the frame structures of the UL and DL carriers. If the network node detects a valid PRACH from the wireless device, a message referred to as "message 2" is returned to the wireless device in response to message 1. Message 2 includes information that commands the wireless device to adjust its initial UL transmission timing for subsequent UL transmissions, that is by starting UL transmission earlier so that the uplink transmissions when received at the network node will be coordinated in time with its downlink transmissions.

The timing relationship between UL and DL transmissions may be configured in different ways. In TDD, the DL and UL frame structures may be perfectly coordinated with a certain time relation, which is also the usual configuration for frequency division duplex (FDD). With a perfect time coordination between the UL and DL frame structure, usage of a time offset by a network node as described above will not only time shift the DL frame structure but also the UL frame structure with the same amount if not compensated according to embodiments herein. This time offset in the DL frame structure will introduce a time shift, e.g. a fraction of an ODFM symbol, in the UL frame structure when received by the same network node.

Figure 4A:
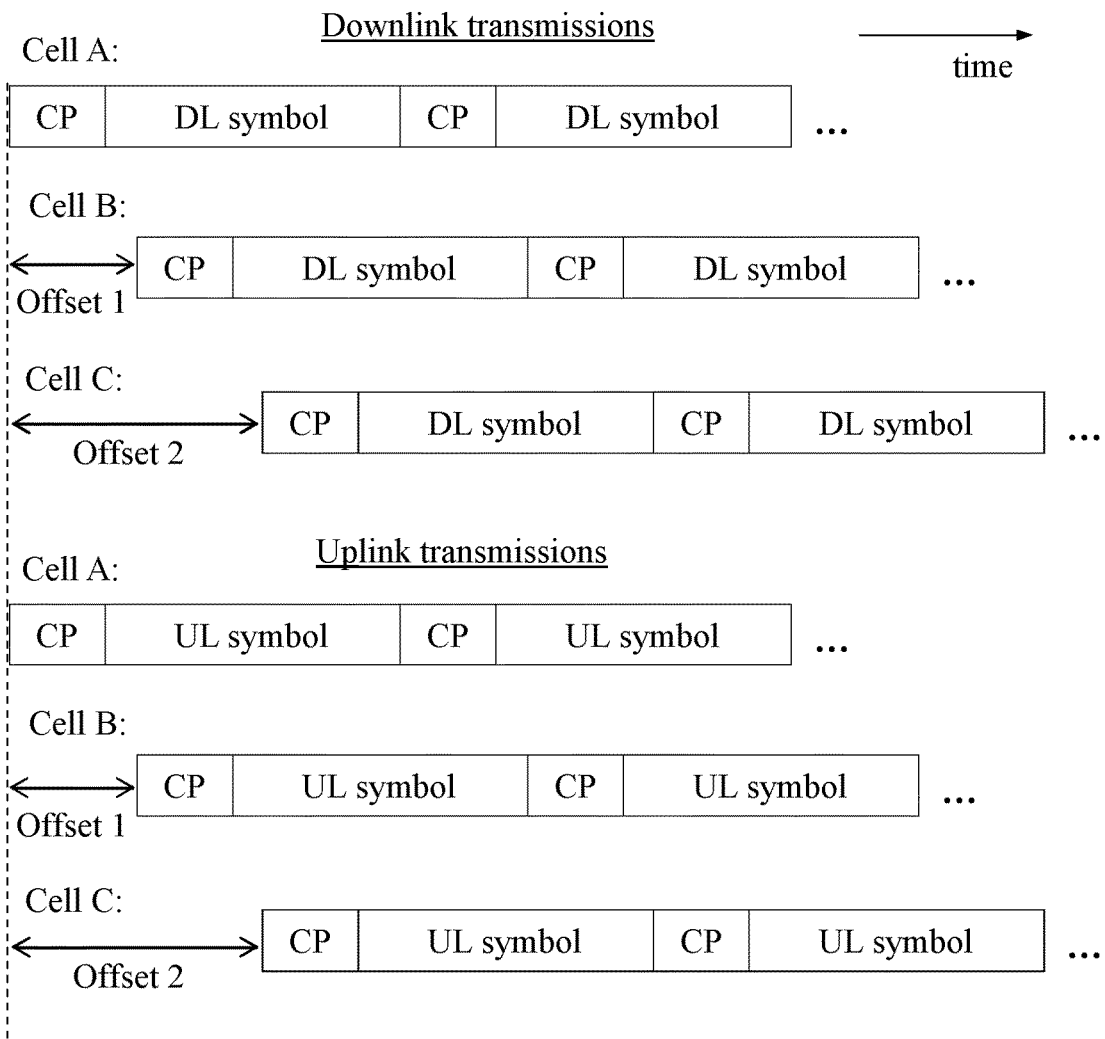
FIG. 4A illustrates timing of downlink symbols and uplink symbols when a respective time offset is used in two cells B and C relative another cell A.

FIG. 4A illustrates how the timing of downlink transmissions and uplink transmissions of signals in resource elements (REs), respectively, would occur in three neighboring cells A, B and C if no timing advance is employed to compensate for a used time offset in cells B and C. This figure thus illustrates the timing of the DL and UL frame structures, also referred to as DL and UL cell carriers, in cells A-C.

Figure 4B:
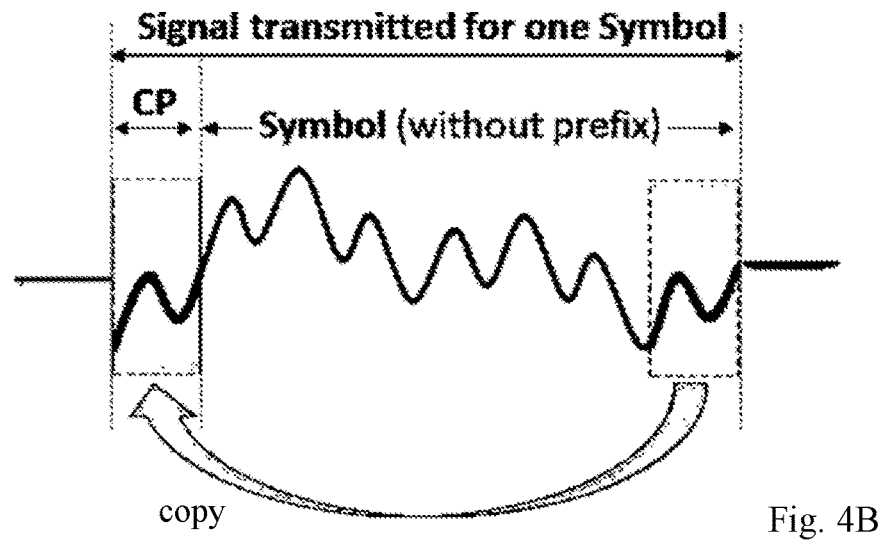
FIG. 4B illustrates that a cyclic prefix (CP) of a symbol comprises a copy of data at the end of said symbol.

It is also shown in FIG. 4A that each RE carries a symbol preceded by a cyclic prefix (CP) which comprises a copy of the signal at the end of said symbol, which is illustrated in more detail in FIG. 4B. This part of the signal is thus duplicated and transmitted twice: at the beginning and the end of the RE.

In cell A, no time offset in terms of delayed downlink transmission relative a neighbor cell is applied, and uplink transmissions in REs from wireless devices in cell A are also coordinated in time, i.e. synchronized, with the downlink transmissions in REs in that cell, as shown in FIG. 4A, e.g. by using the above-described regular timing advance to compensate for propagation delays.

In cell B, a time offset 1 is used for downlink transmissions relative the downlink transmissions in cell A which will reduce the impact of downlink interference to cell A as described above for FIG. 3. If this time offset is not compensated by a timing advance, the uplink transmissions in REs from wireless devices in cell B will be coordinated with the downlink transmissions in that cell since they are synchronized to the DL transmissions. Consequently, the uplink transmissions in cell B will be delayed with the time offset 1 relative the uplink transmissions in cell A, as shown in FIG. 4A.

In a similar manner, a time offset 2 is used in cell C for downlink transmissions relative the downlink transmissions in cell A such that time offset 2 is in this example basically twice as long as time offset 1, which will likewise reduce the impact of downlink interference to both cells A and B. If this time offset is not compensated by a timing advance, the uplink transmissions in REs from wireless devices in cell B will follow the downlink transmissions in that cell. Consequently, the uplink transmissions of symbols in cell C will be delayed with the time offset 2 relative the uplink transmissions of symbols in cell A and also delayed relative the uplink transmissions of symbols in cell B, as shown in FIG. 4A. The symbols transmitted in cells A-C will thus be mutually displaced in time and arrive at the network nodes with a time difference corresponding to the respective time offsets where applied.

Hence, it can be understood from the example in FIG. 4A that uplink transmissions of symbols in cells A, B and C will be displaced relative each other when a time offset is used for the downlink in cells B and C, unless the time offset is compensated by timing advance in the uplink. In the embodiments herein, the wireless devices are instructed to apply a timing advance on the UL that compensates for the DL time offset, so that uplink transmissions in all cells A-C are aligned, i.e. synchronized with each other, which will be described in more detail below. The above-described time offset in the downlink may otherwise cause the following problems when the uplink transmissions are not aligned with each other.

In FDD, separate frequency carriers are used for UL and DL transmissions, respectively. In TDD, a single carrier frequency is used for both UL and DL transmissions, which must therefore occur separated in time. Typically, the TDD frame structure is divided into a set of UL and DL subframes per radio frame, which is well-known in the art. At certain time intervals within the radio frame, there is a switch from a DL subframe to an UL subframe, and vice versa. Further, when there is a switch from a DL subframe to an UL subframe, a so-called special subframe is located between the DL and UL subframes. The special subframe contains a set of guard symbols in which no energy should be transmitted. The purpose of the guard symbols is to protect the first OFDM symbol in the UL from interference arriving from the DL subframe.

Figure 5A:
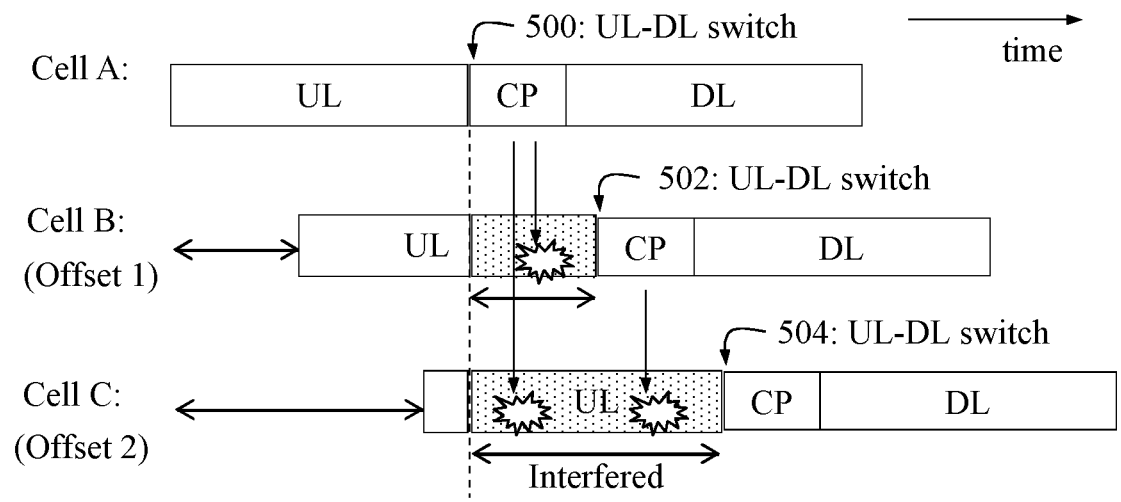
FIG. 5A illustrates how downlink symbols could interfere with uplink symbols in two cells B and C using a respective time offset relative another cell A and time division duplex (TDD) is employed in the cells A-C.

In the transition from an UL subframe to a DL subframe, there is no special subframe and thus no presence of guard symbols. In this solution it has been realized that the absence of guard symbols will make any timing misalignment between the UL cell carriers to cause inter cell interference on the last UL symbol of an UL subframe in one cell from the first DL symbol in a DL subframe in another cell. This is illustrated by FIG. 5A where the timing of a transition from an UL subframe to a DL subframe is shown for three cells A, B and C where time offsets 1 and 2 used for DL transmissions in cells B and C, respectively, in the manner shown in FIG. 4A. This means that the UL-DL transition occurs first in cell A at 500, then in cell B at 502 after time offset 1 and last in cell C at 504 after time offset 2, as shown in FIG. 5A.

As a result, the DL transmission starting in cell A at 500 will cause interference to the UL transmission not yet finished in cells B and C, and similarly the DL transmission starting in cell B at 502 will add further interference to the UL transmission not yet finished in cell C, as illustrated by the dotted parts of the respective UL transmissions in cell B and C before UL-DL transition. This interference from DL to UL may be severe because the transmit power for DL transmissions is generally much higher than for UL transmissions. In the embodiments herein, this inter cell interference can be avoided by compensating the time offsets to achieve aligned UL transmissions, which will be described in more detail below.

Another problem caused by the time offset when the uplink transmissions are not aligned with each other, can occur when coordinated multi-point reception is employed on the uplink. This procedure involves signal detection by applying a Fast Fourier Transform (FFT) operation on a so-called FFT window of a received signal, which is well-known in the art. The FFT window basically defines a time window during which the signal is expected to be received.

Network nodes such as base stations in a wireless network are often equipped with several receive antennas. A radio signal from a wireless device can be received at the network node by combining signals from these several antennas to increase the received signal power and receive diversity. Combining signals from several antennas also makes it possible to suppress interference by employing a procedure called Interference Rejection Combining (IRC). Another procedure that can be used for combining signals from several antennas is Maximum Ratio Combining (MRC)

The antennas of the network node may be divided into sectors that cover different geographical areas. The antennas may be close to the network node or at a distance in case radio remote heads are used.

In many deployments, antenna signals used for combining are located in the same sector, also referred to as single-point reception. In order to further increase the received signal power and to further suppress interference antenna signals from different sectors, several reception points may be combined, known as multi-point reception. Antenna signals may also be sent from one network node to another network node, to be used for combining in the latter network node.

IRC and MRC can be used for combining signals from several antennas both in single-point reception and multi-point reception.

In this solution it has been realized that if the signal is delayed more than a cyclic prefix on any of the network node antennas involved in multi-point reception, some samples will fall outside the FFT window, which can significantly degrade the performance of UL reception in the network node. The FFT window typically has a length that corresponds to the duration of the data part in one OFDM symbol, e.g. 66.67 microseconds.

The antenna points of the network nodes involved in the multi-point reception may be located at significantly different distances relative to the wireless device. Since the wireless device can only synchronize its timing towards one of the network nodes involved in the multi-point reception, the wireless network needs to decide for which network node the UL timing of the wireless device shall be synchronized. The network node responsible for UL timing adjustment will control the synchronization towards the FFT window and the other network nodes involved in the multi-point reception will follow the same timing.

Figure 5B:
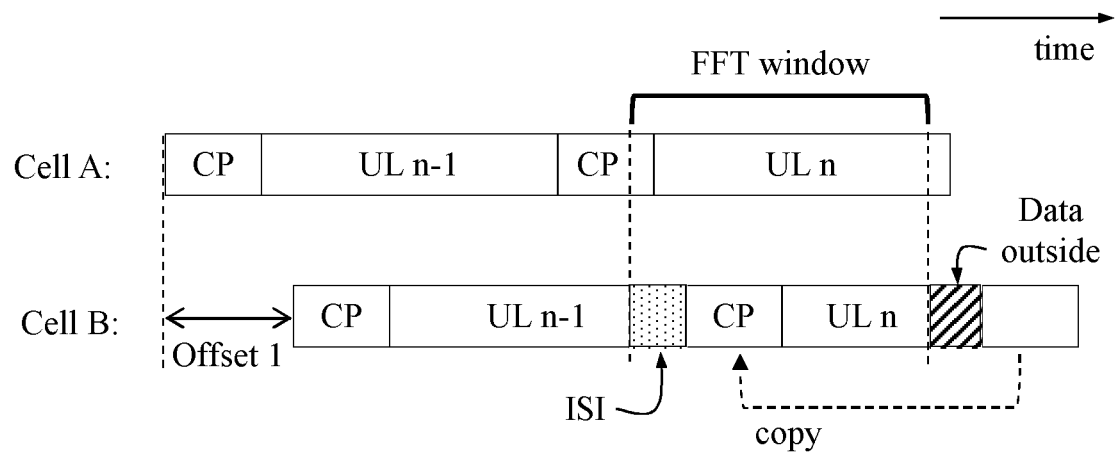
FIG. 5B illustrates how a fast Fourier transform (FFT) operation could be affected when a time offset is used in one cell B relative another cell A.

If there is a large enough difference in propagation delay between the network node that is controlling the UL timing adjustment and one of the other network nodes, then a part of the data may fall outside of the FFT window, which is illustrated in FIG. 5B. In this example, the FFT window is adapted to the timing of cell A to extend basically over an UL subframe n, which means that in cell B this FFT window will extend partly over the foregoing UL subframe n−1 but not covering the UL subframe n leaving a part that lies outside the FFT window, since the time offset 1 is applied in cell B as described above. As a result, there will be inter symbol interference (ISI) from UL subframe n−1, shown as a dotted area, and missing data, shown as a striped area, when the FFT window is applied for the UL signal received in cell B, resulting in poor signal detection for cell B.

This problem is thus likely to occur when a deliberate time offset is introduced, in the manner described above, between those UL cell carriers that are involved in multi-point reception. For simplicity, a scenario can be considered where the propagation delay between the wireless device and the antennas that are involved in the multi-point reception is identical. In this situation, the signals will be arriving at the antennas of the different network nodes at the same time. However, because the positioning of the FFT window in each UL cell carrier will follow the time shift introduced on the DL cell carrier if not compensated by timing advance, e.g. as shown in FIG. 4A, the received signal will in general not be captured in a manner that is synchronized with the FFT window.

Figure 6:
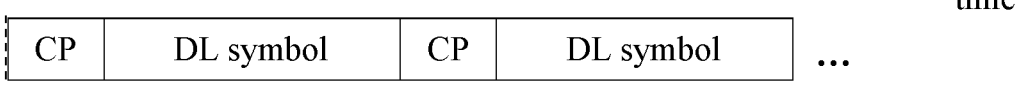
FIG. 6 illustrates timing of downlink symbols and uplink symbols when a respective time offset is used in two cells B and C relative another cell A and the uplink symbols are aligned in cells A-C.
Figure 6:
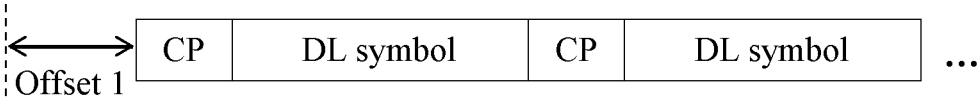
Figure 6:
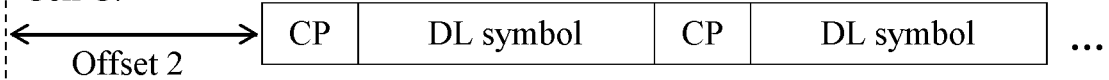
Figure 6:
Figure 6:
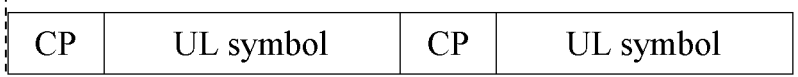
Figure 6:
Figure 6:
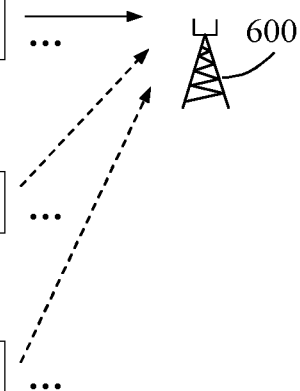

FIG. 6 illustrates how the timing of downlink transmissions and uplink transmissions of signals in REs, respectively, would occur in three neighboring cells A, B and C if timing advance is employed to compensate for the time offsets used in cell B and cell C for the DL transmissions shown in FIG. 4A. In this case, a timing advance is determined for wireless devices in cell B to compensate for the time offset 1 while a timing advance is determined for wireless devices in cell C to compensate for the time offset 2. These timing advances are determined so that the UL transmissions are aligned with each other when received at a network node 600 which could be any of the network nodes of cells A-C. Thereby, the interference from DL transmission in one cell to UL transmission in another cell as shown in FIG. 5A can be avoided. Also, the misalignment of the FFT window between UL signals in two cells can also be avoided.

In the example of FIG. 6, the timing of the UL transmissions in all cells A-C are synchronized to the DL transmissions in cell A which thus acts as a reference cell. However, it is also possible to use any of the other cells B and C instead as a reference cell to which the UL transmissions in cells A-C are synchronized.

Figure 7:
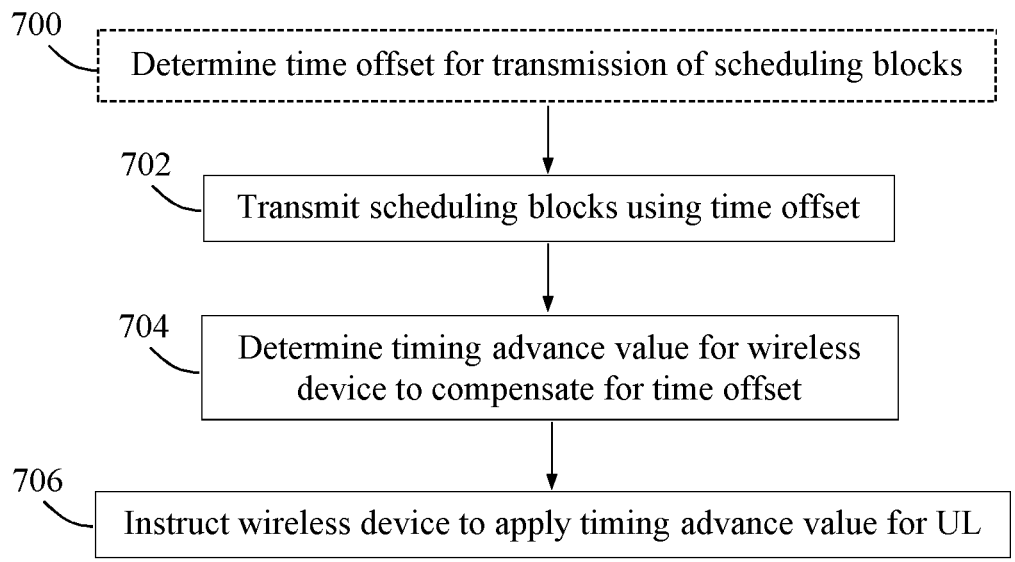
FIG. 7 is a flow chart illustrating a procedure in a network node, according to further example embodiments.

An example will now be described with reference to the flow chart in FIG. 7, of how the solution may be employed in terms of actions performed by a first network node such as the above-described network node 600. FIG. 7 is described below with further reference to FIG. 8 which illustrates a communication scenario where a first network node 800 is operative in a first cell 800A and serves a wireless device 802. A second network node 804 is also shown which is operative in a neighboring second cell 804A.

Some optional example embodiments that could be used in this procedure will also be described below. This procedure may be employed when the first network node 800 is operating in any type of wireless network and any suitable protocols and standards may be employed by the first network node 800 for communication in this network.

The actions in this procedure are thus performed by a first network node 800 of a first cell 800A in a wireless network, for enabling reduction of interference in a second cell 804A from reference signals transmitted in the first cell 800A. A first action 700 illustrates that the first network node 800 may initially determine, or otherwise obtain, a time offset relative transmission of scheduling blocks in the second cell, which time offset will be used for transmitting scheduling blocks in the first cell 800A. For example, the time offset may be determined such that different time offsets are assigned to cells which are expected to interfere with each other by transmission of reference signals. The time offset may alternatively be determined based on a Physical Cell Identity, PCI, of the first cell, e.g. by computing a predefined function of the PCI. The first network node 800 may further signal the time offset to the wireless device 802, e.g. by including the time offset in network assistance information, which enables the wireless device 802 to synchronize reception of downlink transmissions from the first network node 800.

Figure 8:
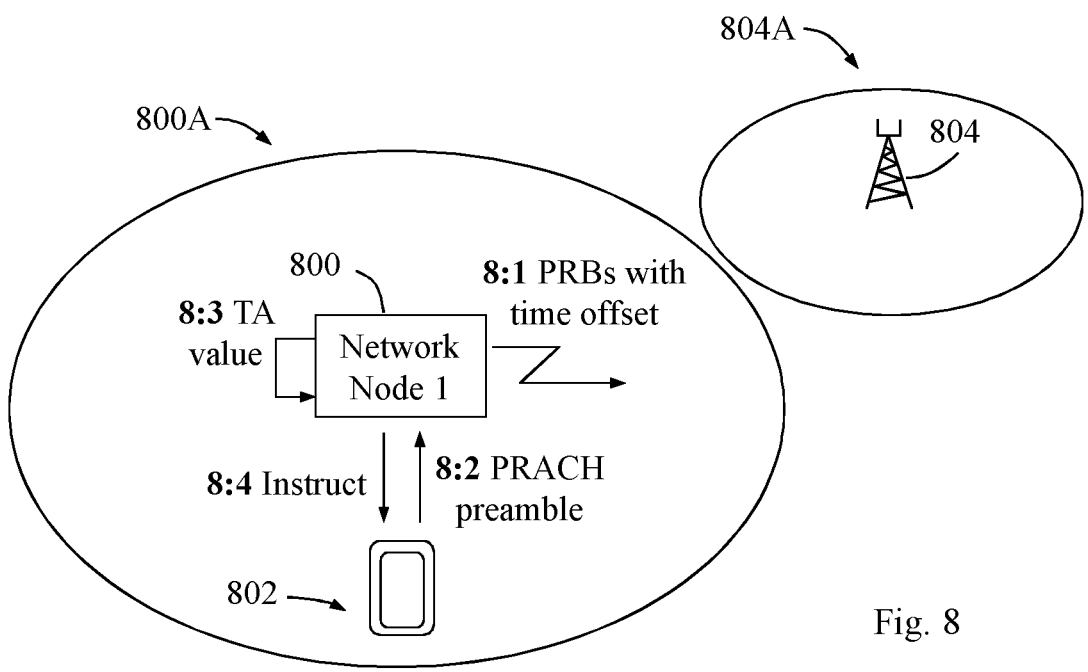
FIG. 8 is a communication scenario where the solution is used, according to further example embodiments.

In a next action 702, the first network node 800 transmits in the first cell scheduling blocks where said reference signals are located in predefined resource element positions, using the above time offset relative transmission of scheduling blocks in the second cell, which is also illustrated by an action 8:1 in FIG. 8.

Thereby, interference caused by the reference signals will hit more than one RE in the scheduling blocks in the second cell such that the interference is spread out and the amount of interference hitting a single RE is thus reduced, as explained above.

In a further action 704, the first network node 800 determines a timing advance value for a wireless device 802 that is served by the first network node 800. The timing advance value may be determined after receiving a PRACH preamble from the wireless device 802 as illustrated by an action 8:2 in FIG. 8. Action 704 corresponds to another action 8:3 in FIG. 8.

The first network node 800 then instructs the wireless device to apply said timing advance value for uplink transmissions, in another action 706. The timing advance value is determined such that uplink symbols transmitted from the wireless device in the first cell are aligned with uplink symbols transmitted in the second cell, when said uplink symbols are received at a second network node of the second cell.

Even though the procedure of FIGS. 7 and 8 was described in terms of two cells with two respective network nodes, the solution and its embodiments described herein may be employed for any number of cells and network nodes. For example, the cells described herein may be served by the same network node or by multiple different network nodes.

Some further example embodiments of the above procedure will now be outlined. In one example embodiment, the timing advance value determined in action 704 may comprise a first part corresponding to the time offset used for transmitting scheduling blocks in the first cell. In more detail, one another example embodiment may be that said first part is determined so that the uplink symbols transmitted from the wireless device 802 are coordinated in time with downlink symbols transmitted by the second network node 804.

In another example embodiment, the timing advance value may further comprise a second part corresponding to a propagation delay of signals between the first network node 800 and the wireless device 802. The timing advance value can, according to another example embodiment, be determined as the sum of said first and second parts, which may also be referred to as first and second components of the timing advance value. Thereby, the timing advance value will compensate for both the applied time offset by means of the first part, and for any propagation delay between the first network node 800 and the wireless device 802 by means of the second part. However, if the wireless device 802 is located close to the first network node 800 the second part would be unwarranted since the propagation delay is negligible.

In another example embodiment, downlink transmission from the first network node 800 may be muted in a subframe that occurs immediately after an uplink subframe configured for random access in the first cell, such as a Physical Random Access Channel PRACH subframe. This embodiment may be useful to reduce leakage of interference into an uplink subframe configured for random access in another cell such as the second cell. Synchronization of the UL transmissions in the first cell towards a DL cell carrier in the second cell is not achieved until the random access procedure has been completed. Thus, leakage of interference to the second cell caused by PRACH transmissions from a wireless device in the first cell may occur before the wireless device has received and applied the timing advance value. The last UL symbol of a PRACH subframe may thus collide with the first DL symbol in any of the neighboring cells that has another sub symbol time offset than the first cell. This can thus be solved by not allowing DL transmissions of scheduling blocks reserved for PRACH in a subframe that is located immediately after the PRACH subframe.

In another example embodiment, the time offset used for transmitting scheduling blocks in the first cell may be a fraction of the duration of an OFDM symbol. This will provide a distribution of the interference power hitting the opposite cell 804A over multiple REs, as illustrated in FIG. 3. In that case, further example embodiments may be that the time offset is any of ½, ⅓ and ⅔ of the duration of the OFDM symbol. In yet another example embodiment, the time offset may be larger than the duration of a cyclic prefix. The cyclic prefix is used in OFDM, as mentioned above, and acts as a buffer region or guard interval to protect the OFDM signals from inter-symbol interference. The cyclic prefix duration is typically 0.0047 milliseconds.

Figure 9:
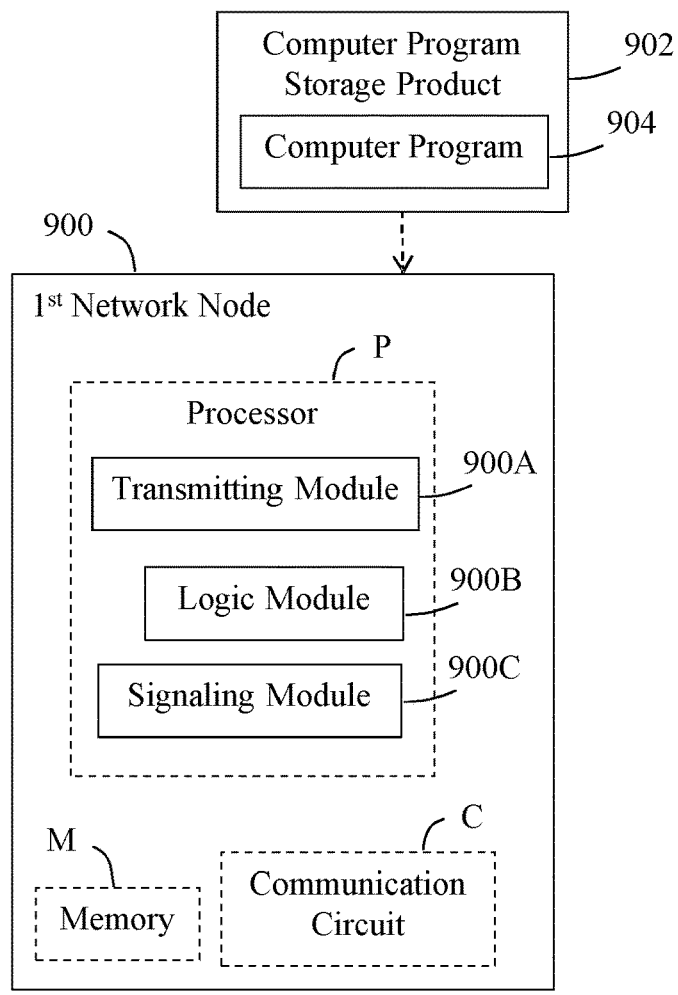
FIG. 9 is a block diagram illustrating how a network node may be structured, according to further example embodiments.

The block diagram in FIG. 9 illustrates a detailed but non-limiting example of how a first network node 900 may be structured to bring about the above-described solution and embodiments thereof. The first network node 900 may be configured to operate according to any of the examples and embodiments of employing the solution as described above, where appropriate, and as follows. The first network node 900 is shown to comprise a processor P and a memory M, said memory comprising instructions executable by said processor P whereby the first network node 900 is operable as described herein. The first network node 900 also comprises a communication circuit C with suitable equipment for transmitting and receiving signals in the manner described herein.

The communication circuit C is configured for communication with wireless devices using suitable protocols depending on the implementation. This communication may be performed in a conventional manner over radio links for wireless communication and using a suitable protocol depending on the implementation, which is not necessary to describe here as such in any detail. The solution and embodiments herein are thus not limited to using any specific types of networks, technology or protocols for radio communication.

The first network node 900 comprises means configured or arranged to perform at least some of the actions 700-706 in FIG. 7. The first network node 900 is arranged or configured to serve a first cell in a wireless network, and to enable reduction of interference in a second cell from reference signals transmitted in the first cell.

The first network node 900 is configured to transmit in the first cell scheduling blocks where said reference signals are located in predefined resource element positions, using a time offset relative transmission of scheduling blocks in the second cell. A scheduling block that is transmitted with such a time offset was described above with reference to FIG. 3. This operation may be performed by a transmitting module 900A in the first network node 900, e.g. in the manner described for action 702 above.

The first network node 900 is also configured to determine a timing advance value for a wireless device served by the first network node 900. This operation may be performed by a logic module 900B in the first network node 900, e.g. as described for action 704 above. The logic module 900B could alternatively be named a determining module, computing module or timing module.

The first network node 900 is also configured to instruct the wireless device to apply said timing advance value for uplink transmissions, the timing advance value being determined such that uplink symbols transmitted from the wireless device in the first cell are aligned with uplink symbols transmitted in the second cell, when said uplink symbols are received at a second network node of the second cell. This instructing operation may be performed by a signaling module 900C in the first network node 900, e.g. as described above for action 706. The signaling module 900C could alternatively be named an instructing module, control module or commanding module.

The first network node 900 may also be configured to mute downlink transmission from the first network node 900 in a subframe that occurs immediately after an uplink subframe, such as a PRACH subframe, configured for random access in the first cell. This operation may be performed by the transmitting module 900A.

It should be noted that FIG. 9 illustrates various functional modules or units in the first network node 900, and the skilled person is able to implement these functional modules or in practice using suitable software and hardware. Thus, the solution is generally not limited to the shown structures of the first network node 900, and the functional modules or units 900A-C therein may be configured to operate according to any of the features and embodiments described in this disclosure, where appropriate.

The functional modules or units 900A-C described above can be implemented in the first network node 900 by means of suitable hardware and program modules of a computer program comprising code means which, when run by the processor P causes the first network node 900 to perform at least some of the above-described actions and procedures.

Figure 9A:
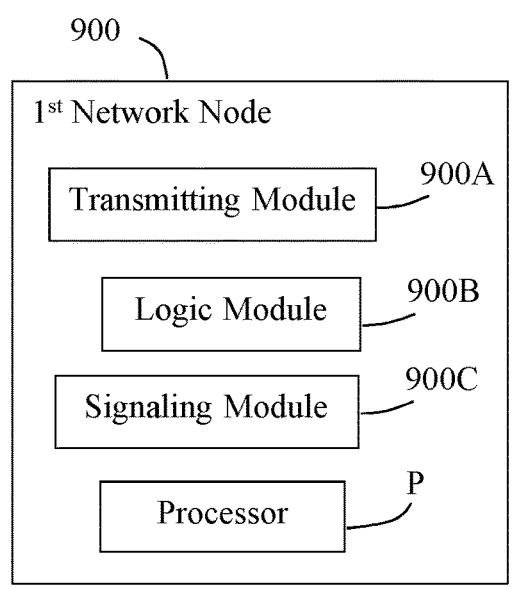
FIG. 9A is a block diagram illustrating how a network node may alternatively be structured, according to further example embodiments.

Another example of how the first network node 900 may be configured is schematically shown in the block diagram of FIG. 9A. In this example, the first network node 900 comprises the functional modules 900A-C and a processor P, the modules 900A-C being configured to operate in the manner described above as controlled by the processor P.

In either FIG. 9 or FIG. 9A, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the first network node 900 in the form of a memory having a computer readable medium and being connected to the processor P. The computer program product or memory in the first network node 900 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the first network node 900.

The solution described herein may be implemented in the first network node 900 by means of a computer program product 902 comprising a computer program 904 with computer readable instructions which, when executed on the first network node 900, cause the first network node 900 to carry out the actions and features according to any of the above embodiments, where appropriate.

Another example of how the first network node 800 may operate when the procedure of FIG. 7 is employed in practice, will now be described in terms of a series of operations 1-6 which form a procedure of coordinating UL transmissions from a wireless device, i.e. an UL cell carrier, with DL transmissions from a reference cell, i.e. a DL reference cell carrier.

Operation 1: Detection of Random Access Preambles

For each UL cell carrier, the first network node 800 listens for random access messages from wireless devices, at certain subframes and scheduling block allocations defined in the broadcast and synchronization channels. A random access preamble from a wireless device is classified as being detected when there is a strong enough correlation between received baseband signal on the PRACH resource and at least one of a set of known Zadhoff Chu preamble sequences that have been defined for the UL cell carrier.

Operation 2: Time of Arrival Estimation of Random Access Preamble

The first network node 800 estimates the time of arrival, $T_{PRACH}^{UL\text{-}carrier}$, of the detected random access preamble. The time of arrival for random access preamble is measured relative to the subframe border of the DL cell carrier, which is the instance in time when the wireless device will start the transmission of a random access preamble.

Operation 3: UL Carrier Coordination Towards DL Carrier

The first network node 800 calculates the amount of timing adjustment, $\Delta T_{adjustment}^{UL\text{-}carrier}$, that is required for the UL signal to reach the network node 800 at the desired time of reception, $T_{desired}^{UL\text{-}carrier}$. The desired timing position, $T_{desired}^{UL\text{-}carrier}$, is located within the cyclic prefix. The desired time of reception within the cyclic prefix of the UL carrier is measured relative to the subframe border of the corresponding DL carrier. Thus, the subframe border of the DL carrier acts as the timing reference point in the time of arrival measurement of the random access preamble. The timing adjustment value required to align the UL carrier into the desired timing position relative to the DL carrier is calculated as: $\Delta T_{adjustment}^{UL\text{-}carrier} = t_{desired}^{UL\text{-}carrier} - T_{PRACH}^{UL\text{-}carrier}$, which thus corresponds to the above-described second part of the timing advance value compensating for the propagation delay.

Operation 4: UL Carrier Coordination Towards DL Reference Carrier

Next, the first network node 800 calculates the amount of additional timing adjustment $\Delta T_{reference}^{UL-carrier}$ that is needed to make the UL carrier from the wireless device coordinated towards the DL reference cell carrier instead of the cell carrier in which the random access message was detected. The required additional adjustment, $\Delta T_{reference}^{UL-carrier}$, is calculated as the difference between: the subframe border position, $T_{PRACH}^{DL-carrier}$, of the DL cell carrier in which the random access preamble was detected, and the subframe border position of the DL reference carrier, $T_{reference}^{DL-carrier}$. The additional timing adjustment required that is needed can also be expressed as: $\Delta T_{reference}^{UL-carrier} = T_{reference}^{DL-carrier} - T_{PRACH}^{DL-carrier}$, which thus corresponds to the above-described first part of the timing advance value compensating for the time offset.

Operation 5: Transmission of Message 2 Response with Timing Adjustment Command

The first network node 800 sends the total timing advance value, $TA = \Delta T_{reference}^{UL-carrier} + \Delta T_{adjustment}^{UL-carrier}$, i.e. the sum of the above first and second parts, as a part of the message 2 response to the wireless device to acknowledge the wireless device that the random access message was received.

Operation 6: Device Action in Response to Timing Alignment Command

If the wireless device receives and successfully decodes the message 2, it will read the timing advance information and adjusts the UL transmission timing accordingly. This completes the alignment procedure of the UL cell carrier.

When the above described solution and at least some of its embodiments are employed, it is an advantage that the impact of interference from each reference signal in the scheduling block transmitted in the first cell will be distributed over several resource elements in the scheduling block transmitted in the second cell, so that the interference hitting each individual resource elements is reduced. Thereby, the interference power in a single resource element is reduced and the wanted signal therein can be detected and decoded more successfully due to the lower interference.

Another advantage is that interference from downlink symbols on uplink symbols across two or more cells using a TDD scheme can be avoided by aligning the uplink transmissions in the cells by instructing the wireless device to apply a timing advance value that compensates for the time offset. Yet another advantage is that an FFT operation on symbols received in two or more cells can be successfully performed even when a time offset is used in at least one of the cells, since the positioning of the FFT window in each UL cell carrier will be the same and the received signal will be captured in a manner that is thus synchronized with the FFT window.

Figure 10:
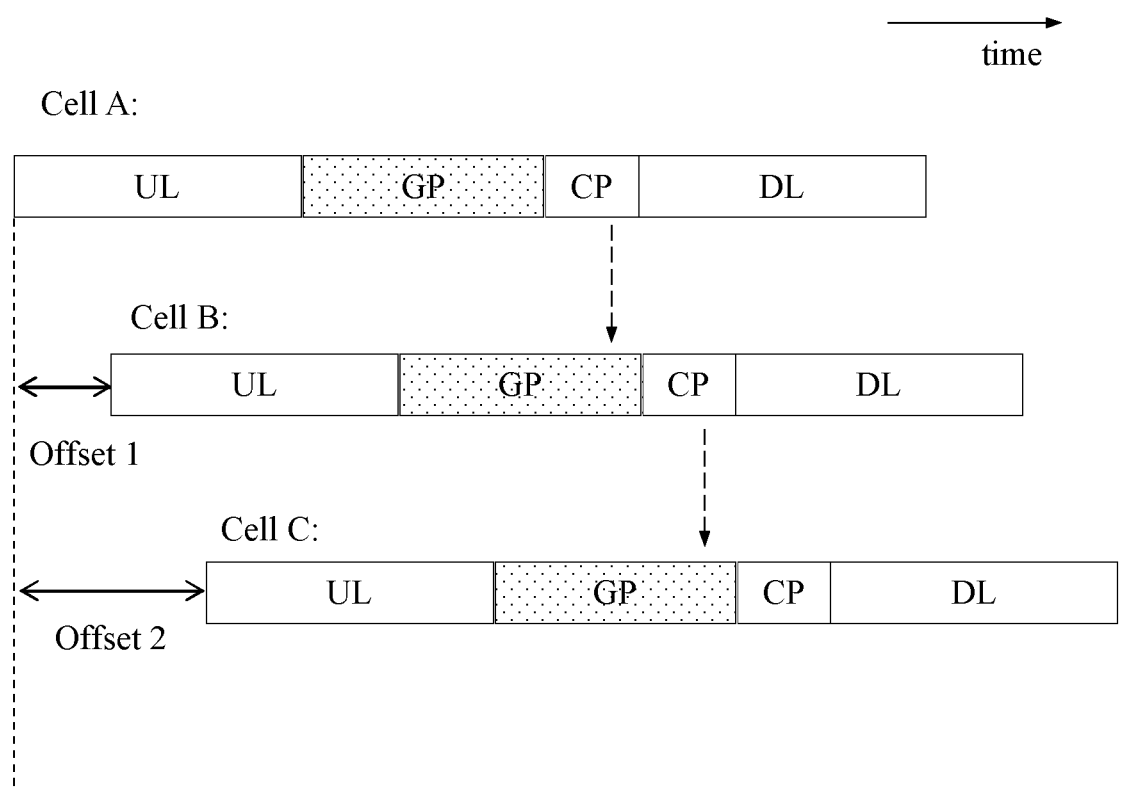
FIG. 10 illustrates how a guard period GP can be inserted at each UL-DL transition when TDD is employed in the cells A-C.

As an alternative to aligning the UL transmissions in at least two cells in the manner described herein when time offset is applied for DL transmissions in TDD, another possibility is to insert a muted guard period between every transition from UL to DL. Thereby, no interference from a downlink transmission in one cell will hit any uplink transmission occurring at the same time in another cell. This is illustrated in FIG. 10 where a guard period GP is inserted after the UL period and before the DL period at each UL-DL transition. Thereby, no interference from DL to UL will occur as illustrated by dashed arrows.

This alternative may thus be useful for TDD in situations where the need for a simultaneous reception of the UL carriers at the eNB is of less importance. Instead of aligning the UL carriers, a guard symbol is inserted at the switching point from an UL subframe to a DL subframe. The guard symbol may be created by configuring the last symbol in the UL subframe as a sounding symbol. By not allowing transmissions in this sounding symbol this symbol will become muted and would consequently act as a guard symbol in a manner equivalent to the guard period in the special subframe. This alternative could be defined as follows in case it is the wireless device that performs the muting:

A method performed by a first network node of a first cell in a wireless network, for enabling reduction of interference in a second cell from reference signals transmitted in the first cell, the method comprising:
transmitting in the first cell scheduling blocks where said reference signals are located in predefined resource element positions, using a time offset relative transmission of scheduling blocks in the second cell, and
instructing the wireless device to mute transmission in a guard period before a transition from uplink to downlink in a TDD scheme such that a preceding uplink symbol transmitted from the wireless device is not interfered by a downlink transmission in the second cell.

A first network node of a first cell in a wireless network, arranged to enable reduction of interference in a second cell from reference signals transmitted in the first cell, the first network node being configured to:
transmit in the first cell scheduling blocks where said reference signals are located in predefined resource element positions, using a time offset relative transmission of scheduling blocks in the second cell, and
instruct the wireless device to mute transmission in a guard period before a transition from uplink to downlink in a TDD scheme such that a preceding uplink symbol transmitted from the wireless device is not interfered by a downlink transmission in the second cell.

While the solution has been described with reference to specific exemplifying embodiments, the description is generally only intended to illustrate the inventive concept and should not be taken as limiting the scope of the solution. For example, the terms "cell", "network node", "reference signals", "scheduling block", "resource element", "time offset", "timing advance", "OFDM symbol", "shifted CRSs" and "cyclic prefix" have been used throughout this disclosure, although any other corresponding entities, functions, and/or parameters could also be used having the features and characteristics described here. The solution is defined by the appended claims.

The invention claimed is:

1. A method performed by a first network node of a first cell in a wireless network for enabling reduction of interference in a second cell from first reference signals transmitted in the first cell, the method comprising:
determining to use a time offset relative to transmission of scheduling blocks in the second cell for reducing interference in the second cell from the first reference signals transmitted in the first cell;
transmitting in the first cell scheduling blocks using the time offset, wherein the first reference signals are located in predefined resource element positions included in the scheduling blocks transmitted in the first cell;

determining a timing advance value for a wireless device served by the first network node; and instructing the wireless device to apply said timing advance value for uplink transmissions, the timing advance value being determined such that first uplink symbols transmitted from the wireless device in the first cell are aligned with second uplink symbols transmitted in the second cell when the second uplink symbols are received at a second network node of the second cell.

2. The method of claim 1, wherein determining the timing advance value comprises calculating the timing advance value using a timing value corresponding to the time offset that was used to transmit the scheduling blocks in the first cell.

3. The method of claim 1, wherein
the timing advance value comprises a first part corresponding to the time offset used for transmitting the scheduling blocks in the first cell, and
said first part is determined so that the second uplink symbols transmitted from the wireless device are coordinated with downlink symbols transmitted by the second network node.

4. The method of claim 1, wherein
the timing advance value comprises a first part corresponding to the time offset used for transmitting the scheduling blocks in the first cell, and
the timing advance value further comprises a second part corresponding to a propagation delay of signals between the first network node and the wireless device.

5. The method of claim 4, wherein the timing advance value is determined as the sum of said first and second parts.

6. The method of claim 1, wherein downlink transmission from the first network node is muted in a subframe that occurs immediately after an uplink subframe configured for random access in the first cell, and the uplink subframe configured for the random access in the first cell is a Physical Random Access Channel (PRACH) subframe.

7. The method of claim 1, wherein the time offset used for transmitting scheduling blocks in the first cell is a fraction of the duration of an Orthogonal Frequency-Division Multiplexing (OFDM) symbol.

8. The method of claim 7, wherein the time offset is any of ½, ⅓ and ⅔ of the duration of the OFDM symbol.

9. The method of claim 1, wherein the time offset is larger than the duration of a cyclic prefix.

10. A first network node, comprising:
memory; and
processing circuitry coupled to the memory, wherein the first network node is arranged to serve a first cell in a wireless network and enable reduction of interference in a second cell from first reference signals transmitted in the first cell, wherein the first network node is configured to:
determine to use a time offset relative to transmission of scheduling blocks in the second cell for reducing interference in the second cell from the first reference signals transmitted in the first cell;
transmit in the first cell scheduling blocks using the time offset, wherein the first reference signals are located in predefined resource element positions included in the scheduling blocks transmitted in the first cell;
determine a timing advance value for a wireless device served by the first network node; and
instruct the wireless device to apply said timing advance value for uplink transmissions, the timing advance value being determined such that uplink symbols transmitted from the wireless device in the first cell are aligned with uplink symbols transmitted in the second cell when the second uplink symbols are received at a second network node of the second cell.

11. The first network node of claim 10, wherein determining the timing advance value comprises calculating the timing advance value using a timing value corresponding to the time offset that was used to transmit the scheduling blocks in the first cell.

12. The first network node of claim 10, wherein
the timing advance value comprises a first part corresponding to the time offset used for transmitting the scheduling blocks in the first cell, and
the first network node is configured to determine said first part so that the uplink symbols transmitted from the wireless device are coordinated with downlink symbols transmitted by the second network node.

13. The first network node of claim 10, wherein
the timing advance value comprises a first part corresponding to the time offset used for transmitting the scheduling blocks in the first cell, and
the timing advance value further comprises a second part corresponding to a propagation delay of signals between the first network node and the wireless device.

14. The first network node of claim 13, wherein the first network node is configured to determine the timing advance value as the sum of said first and second parts.

15. The first network node of claim 10, wherein the first network node is configured to mute downlink transmission from the first network node in a subframe that occurs immediately after an uplink subframe configured for random access in a neighboring cell, and the uplink subframe configured for the random access in the first cell is a Physical Random Access Channel (PRACH) subframe.

16. The first network node of claim 10, wherein the time offset used for transmitting scheduling blocks in the first cell is a fraction of the duration of an Orthogonal Frequency-Division Multiplexing (OFDM) symbol.

17. The first network node of claim 16, wherein the time offset is any of ½, ⅓ and ⅔ of the duration of the OFDM symbol.

18. The first network node of claim 10, wherein the time offset is larger than the duration of a cyclic prefix.

19. A computer program product comprising a non-transitory computer readable medium storing a computer program comprising instructions which, when executed on at least one processor, cause the at least one processor to carry out the method of claim 1.

* * * * *